United States Patent
Walker et al.

(10) Patent No.: US 6,800,717 B2
(45) Date of Patent: *Oct. 5, 2004

(54) ACID CATALYZED COPOLYMERIZATION OF WATER AND EPOXY RESIN AND USES THEREOF

(75) Inventors: Frederick Herbert Walker, Allentown, PA (US); John Bartram Dickenson, North Wales, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 28 days.

This patent is subject to a terminal disclaimer.

(21) Appl. No.: 10/062,924

(22) Filed: Jan. 31, 2002

(65) Prior Publication Data

US 2003/0032738 A1 Feb. 13, 2003

Related U.S. Application Data

(63) Continuation-in-part of application No. 09/863,156, filed on May 23, 2001, now abandoned.

(51) Int. Cl.[7] .................. C08G 59/68; C08G 59/72; C08L 71/00
(52) U.S. Cl. .................. 528/88; 525/107; 525/454; 525/495; 525/497; 525/498; 525/504; 525/510; 525/528; 528/89; 528/90; 528/91; 528/92
(58) Field of Search .................. 528/89, 90, 91, 528/88, 92; 525/107, 454, 495, 497, 498, 504, 510, 528

(56) References Cited

U.S. PATENT DOCUMENTS

| | | | |
|---|---|---|---|
| 2,872,427 A | 2/1959 | Schroeder | 260/29.2 |
| 3,305,565 A | 2/1967 | Mueller et al. | 260/348.6 |
| 4,173,710 A * | 11/1979 | Boulet et al. | 568/614 |
| 4,540,740 A | 9/1985 | Olson et al. | 524/811 |
| 4,596,843 A | 6/1986 | Wind | 523/416 |
| 4,611,026 A | 9/1986 | Olson et al. | 524/548 |
| 5,908,902 A | 6/1999 | Pfeil et al. | 525/524 |
| 5,925,694 A | 7/1999 | Stengel-Rutkowski et al. | 523/412 |
| 6,107,433 A * | 8/2000 | Petrovic et al. | 528/1 |
| 6,331,583 B1 | 12/2001 | Walker | 523/404 |

OTHER PUBLICATIONS

Chemical abstracts accession No. 2002:130912, Walker et al., "Cationic polymerization of emulsified epoxy resins," Athens Conference on Coatings: Science and Technology, Proceedings, 27th, Jul. 2–6, 2001, pp. 371–387.*

C. A. May (Ed.) Epoxy Resins Chemistry and Technology, Marcel Dekker, Inc.: New York, 1988.

Lidarik, et al. (Polymer Sci. USSR, 1984. 5, 589).

R. W. Lenz, "Organic Chemistry of Synthetic High Polymers," Interscience Publishers, New York, 1967, pp 531–546.

* cited by examiner

Primary Examiner—Robert Sellers
(74) Attorney, Agent, or Firm—Michael Leach

(57) ABSTRACT

Non-gelled polymeric polyols are prepared by the acid catalyzed copolymerization of epoxy resins and water. When the starting resin is an epoxy resin derived from bisphenol-A, the resulting product has much lower levels of bisphenol-A and diglycidyl ether of bisphenol-A (DGEBA) compared to traditional epoxy resins of comparable molecular weight prepared by the advancement process. The product can be cured with OH reactive crosslinkers such as amino resins and polyisocyanates to yield thermosetting coatings with useful properties.

33 Claims, No Drawings

ACID CATALYZED COPOLYMERIZATION OF WATER AND EPOXY RESIN AND USES THEREOF

CROSS-REFERENCE TO RELATED APPLICATIONS

This application is a continuation-in-part of application Ser. No. 09/863,156 filed May 23, 2001 abandoned.

FIELD OF THE INVENTION

The present invention relates to polymeric polyols prepared by the polymerization of epoxy resins.

BACKGROUND OF THE INVENTION

Epoxy resins are commercially important materials that are used extensively to make thermosetting products for use in coatings, adhesives, composites, and many other applications. The largest volume of epoxy resins utilized in commerce are those based upon the diglycidyl ether of bisphenol-F (DGEBF), epoxy novolac resins, and those based upon the diglycidyl ether of bisphenol-A (DGEBA). Of these, the bisphenol-A based products are utilized in much larger volumes than the other products.

Bisphenol-A derived epoxy resins are essentially linear polymers available in a wide range of molecular weights, represented generically by the following chemical structure:

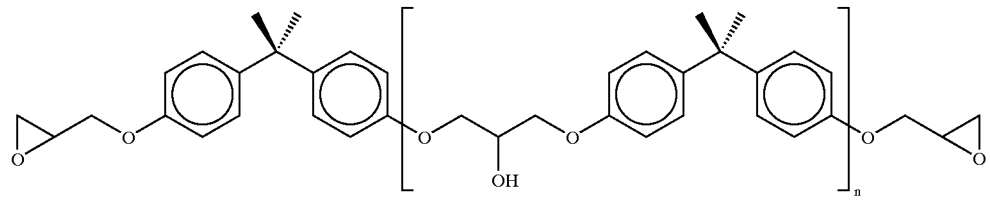

where n represents the average number of repeat units in the polymer. The low end of the range of available molecular weight products are made by reaction of bisphenol-A with excess epichlorohydrin, followed by treatment with base. They are referred to by those who work in the industry as liquid epoxy resin, BADGE, or DGEBA, even though most of the commercial products are not pure DGEBA but often have a value of n of about 0.15 or slightly higher. Higher molecular weight epoxy resins (greater than about 400 Daltons) are commercially prepared by the so-called "advancement process" which is the reaction of excess DGEBA with bisphenol-A, where the ratio of DGEBA to bisphenol-A is used to control the final average molecular weight.

Epoxy resins contain epoxide rings at the chain ends, and (with the exception of pure DGEBA) secondary hydroxyl groups spaced along the polymer backbone. Both of these functional groups can be utilized to cure the epoxy resin. For example, multifunctional amines, mercaptans, and carboxylic acids are utilized to crosslink through the epoxide ring. Amino resins such as melamine-formaldehyde and urea-formaldehyde resins, and polyisocyanates are utilized to crosslink through the hydroxyl groups. Finally, resins such as resoles crosslink through both the hydroxyl and epoxide functional groups. For most purposes, epoxy resins that are crosslinked via the epoxide end groups have epoxy equivalent weights (EEW) of at most about 800, and frequently far less than this. On the other hand, when crosslinked through hydroxyl groups, higher molecular weight epoxy resins are generally preferred, and very low molecular weight epoxy resins such as pure DGEBA which lack OH groups cannot be utilized at all in such a thermosetting system.

Because high molecular weight epoxy resins are prepared by the reaction of DGEBA and bisphenol-A, such resins prepared using current commercial processes have relatively high levels of residual bisphenol-A and DGEBA in the final products. Unfortunately, these compounds are of concern with regard to their human health effects and pseudo-estrogenic activity. This is particularly true in the industry for coatings for food and beverage can interiors, where epoxy resins are currently utilized in large volumes for coatings that are crosslinked with amino resins and other OH-reactive crosslinking agents. Thus, there is a strong need to develop coatings with properties similar to those obtained from crosslinked epoxy resins, but without such high levels of residual DGEBA and bisphenol-A, which can be extracted into the contents of the can and thus become a component of the human diet.

Despite the fact that epoxy resins can be crosslinked with amino resins and the like through the secondary hydroxyl groups on the resin backbone, it is generally found that significantly higher temperatures and/or bake times are required than are necessary with other polyols utilized in coatings, such as acrylic polyols and polyester polyols. It is thought that the relatively hindered environment of the OH groups on the epoxy resin is responsible for this effect. Obviously, this is usually a significant drawback to the utilization of epoxy resins in such coatings, since higher oven temperatures and/or bake times lead to higher production costs.

The cationic or acid-catalyzed polymerization (or homopolymerization) of multifunctional epoxy resins to yield gelled or crosslinked final products is a well-known process of significant commercial importance. Lewis acids are most commonly employed, but appropriate Brønsted acids can also be utilized. For example, C. A. May (Ed.), *Epoxy Resins Chemistry and Technology*, Marcel Dekker, Inc.: New York, 1988, reports (p. 495) that Lidarik et. al. (Polymer Sci. USSR, 1984, 5, 589) polymerized glycidyl ethers with complexes of antimony pentachloride, boron trifluoride, and perchloric acid. Additional examples are reported in May. In addition, the photoinitiated cationic polymerization of epoxy resins is well-known, and also of commercial importance. As reviewed in May (pp. 496–498), cationic photoinitiators are materials that upon photolysis generate strong Brønsted acids, which serve as the true catalyst for the epoxide polymerization.

The copolymerization of water with monofunctional epoxide compounds has been known for some time. For example, R. W. Lenz, *Organic Chemistry of Synthetic High Polymers*, Interscience Publishers: New York, 1967, pp. 531–546, reviews the ring-opening polymerization of cyclic ethers including epoxides, and notes that C. Matignon, et.al. (*Bull. Soc. Chim.*, 1, 1308 (1934)) studied the effect of water content on the oligomer distributions obtained from the acid-catalyzed hydration of ethylene oxide.

U.S. Pat. No. 6,331,583 B1 discloses compositions of emulsified polymeric polyols prepared by a method comprising the acid catalyzed, non-reversible polymerization of lower molecular weight epoxy resins in an aqueous emulsified state. Coating compositions are prepared from the emulsified polymeric polyols crosslinked with various crosslinking agents.

U.S. Pat. No. 2,872,427 discloses oil-in-water emulsions of polyepoxide resins and their heat cure with various curing agents, including acid acting curing agents.

SUMMARY OF THE INVENTION

Multifunctional epoxide compounds and water are copolymerized by treatment with certain acid catalysts, optionally in the presence of a solvent, to produce higher molecular weight polyol products. The molecular weight (Mw or Mn) of the polyol products can be changed by varying the ratio of water to multifunctional epoxide compound.

An embodiment of the invention provides a method which comprises copolymerizing a multifunctional epoxide resin and water in the presence of an effective amount of acid catalyst and optionally in the presence of a solvent that substantially dissolves both the epoxide resin and water, the amount of water being sufficient to avoid gelation. The copolymerization although conducted with water is not conducted in the form of an aqueous dispersion, or emulsion, polymerization leading to an aqueous polymer dispersion, i.e., it comprises a non-dispersion, non-emulsion, copolymerization.

Another embodiment of the invention provides compositions comprising higher molecular weight polyols, or polymeric polyols, having a number average molecular weight (Mn) of at least about two times the molecular weight of the multifunctional epoxy resin from which they are prepared. In the case of DGEBA resin, the Mn would be at least about 750. The polymeric polyols will comprise glycol end groups and a repeat unit structure which contains two glycidyl units, primary and/or secondary alcohols. When prepared according to the inventive copolymerization method, these polyol compositions will also be substantially free of surfactants, i.e., free of emulsifying agents, that are required for aqueous emulsion, or dispersion, polymerization.

Another embodiment of the invention provides compositions comprising higher molecular weight polyols, or polymeric polyols, prepared from diglycidyl ether of dihydric phenols or diols, such as bisphenol-A, in which the level of residual dihydric phenol or diol in the polyol is less than 20 ppm, preferably less than 10 ppm, and the level of residual diglycidyl ether of dihydric phenol or diol is less than 500 ppm, preferably less than 100 ppm.

As yet another embodiment, the higher molecular weight polymeric polyols can be formulated with suitable OH-reactive crosslinking agents, including amino resins such as melamine formaldehyde resins or polyisocyanates, to yield crosslinked films exhibiting excellent properties such as high hardness and solvent resistance at relatively low bake temperatures.

DETAILED DESCRIPTION OF THE INVENTION

The method for making the polymeric polyols comprises polymerizing a multifunctional epoxide resin and sufficient water to prevent gelation of the polymerizing epoxide resin, in the presence of an acid substance and optionally, but preferably, in the presence of a solvent that provides a polymerization medium that dissolves the reactants, i.e., affords solution polymerization.

The multifunctional epoxide compounds, or resins, useful in this invention comprise those compounds containing an average of more than one 1,2-oxirane groups per molecule, and which do not contain basic functional groups that destroy the catalytic activity of the acid catalysts, thus preventing the desired copolymerization. Such epoxides are described in Y. Tanaka, "Synthesis and Characteristics of Epoxides", in C. A. May, ed., Epoxy Resins Chemistry and Technology (Marcel Dekker, 1988). Examples include epoxides of polyunsaturated organic compounds, oligomers of epihalohydrins, glycidyl derivatives of hydantoin and hydantoin derivatives, glycidyl ethers of polyvalent alcohols, glycidyl derivatives of triazines, and glycidyl ethers of polyhydric phenols. Epoxides of polyunsaturated organic compounds include divinyl benzene, cyclohexadiene, cyclooctadiene, dicyclopentadiene, cyclododecadiene, cyclododecatriene, isoprene, 1,5-hexadiene, butadiene, polybutadiene, polyisoprene, and the like. Glycidyl ethers of polyvalent alcohols include glycidyl ethers of neopentyl, ethylene, propylene, and butylene glycol, trimethylolpropane, 2-ethyl-1,3-hexanediol, 2,2-diethyl-1,3-propanediol, 2-butyl-2-ethyl-1,3-propanediol, 1,6-hexanediol, 1,4-butanediol, 1,3-propanediol, 1,5-pentanediol, 1,8-octanediol, 1,10-decanediol, 1,12-dodecanediol, 1,2-cyclohexanediol, 1,4-cyclohexanediol, 1,4-cyclohexane dimethanol, glycerin, sorbitol, pentaerythritol, and the like. Glycidyl ethers of polymeric polyvalent alcohols are also suitable and include the glycidyl ethers of polyethylene glycol, polypropylene glycol, polybutylene glycol, the various copolymers of ethylene, propylene, and butylene oxide, polyvinyl alcohol, polyallyl alcohol, and the like. The glycidyl derivatives include triglycidyl isocyanurate.

Another useful class of epoxy resins are the cycloaliphatic epoxy resins, examples of which are manufactured by Dow Chemical Company, formerly Union Carbide Corporation. These are multifunctional epoxide compounds made by oxidizing cyclohexene containing compounds to add oxygen across the double bond. Useful cycloaliphatic epoxy resins include ERL-4221, ERL-4299, and ERL-4206.

Glycidyl ethers of polyhydric phenols include the glycidyl ethers of dihydric phenols, including resorcinol, hydroquinone, bis-(4-hydroxy-3,5-difluorophenyl)-methane, 4,4'-(9-fluorenylidene)diphenol, 1,1-bis-(4-hydroxyphenyl)-ethane, 2,2-bis-(4-hydroxy-3-ethylphenyl) propane, 2,2-bis-(4-hydroxy-3,5-dichlorophenyl)-propane, 2,2-bis-(4-hydroxyphenyl)-propane (more commonly known as bisphenol-A), brominated bisphenol-A, chlorinated bisphenol-A, and bis-(4-hydroxyphenyl)-methane (more commonly known as bisphenol-F, and which may contain varying amounts of 2-hydroxy-phenyl isomers), and the like. Also useful are the advanced dihydric phenols of the following structure:

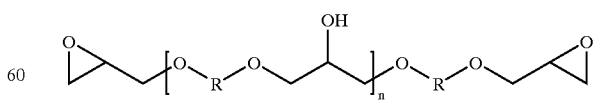

where n is an integer, and R is a divalent hydrocarbon radical of a dihydric phenol, such as the dihydric phenols listed above. Such materials are prepared by polymerizing mixtures of the dihydric phenol and epichlorohydrin, or by advancing a mixture of the diglycidyl ether of the dihydric phenol and the dihydric phenol. While in any given molecule the value of n is an integer, the materials are invariably mixtures which can be characterized by an average value of n which is not necessarily a whole number. Useful in this invention are polymers with an average value of n between 0 and about 15.

Also useful in this invention are the epoxy novolac resins, which are the glycidyl ethers of novolac resins. Novolac resins are the reaction product of a mono or dialdehyde, most usually formaldehyde, with a mono or polyphenolic material. Examples of monophenolic materials which may be utilized include phenol, the cresols, p-tert-butylphenol, nonylphenol, octylphenol, other alkyl and phenyl substituted phenols, and the like. Polyphenolic materials include the various diphenols including bisphenol-A and the like. Aldehydes which are utilized for the novolac include formaldehyde, glyoxal, and the higher aldehydes up to about C4. The novolacs typically are complex mixtures with different degrees of hydroxyl functionality.

The preferred polyepoxy compounds are the diglycidyl ethers of bisphenol-A, the advanced diglycidyl ethers of bisphenol-A, the diglycidyl ethers of bisphenol-F, the diglycidyl ether of resorcinol and the epoxy novolac resins. The most preferred polyepoxy compounds are the diglycidyl ethers of bisphenol-A.

As the average functionality of the multifunctional epoxy resin is increased, it will be recognized by those skilled in the art that a larger ratio of water per equivalent of epoxide resin will be required to prevent gelation, as predicted by well-known theories of gelation.

Ordinary tap water can be used to supply the water to prepare the polyols of the current invention. However, in many cases tap water contains high levels of ionic species that may be undesirable in certain applications, and tap water also tends to be somewhat variable in its purity. Therefore, it will often be advantageous to employ deionized or distilled water or another purified form of water. The minimum amount of water for the polymerization will be that amount sufficient to avoid gelation of the polymer product, desirably about 2.5–10 g water/equivalent epoxide resin, or about 5–20 g water/100 g epoxide resin. The upper limit for the amount of water is determined by the molecular weight of the polymeric polyol desired. With any given multifunctional epoxide compound, the more water used as a reactant the lower the molecular weight of the polymeric polyol product.

In order to copolymerize the multifunctional epoxide compound and water, an acid catalyst with the ability to yield the desired technical effect is required. Not all acid substances are suitable. Certain Brønsted acids and certain Lewis acids have been found to be effective catalysts for the copolymerization.

It is known that many acids, particularly Brønsted acids designated generically as HX, react with epoxide functional groups by addition of HX across the ring as shown in the following equation;

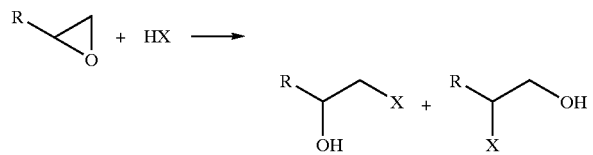

Examples of acids that react in this way include sulfuric acid, hydrochloric acid, many of the organic sulfonic acids, carboxylic acids, phosphoric acid, and many other organic and inorganic acids. If the acid catalyst reacts in this way under the conditions employed to yield a stable product, the catalyst is consumed and the desired polymerization will not occur. Without wishing to be bound by theory, it is believed that in order to effect copolymerization with water using a Brønsted acid in accordance with this invention, the Brønsted acid catalyst employed must contain a counterion $X^-$ that is a very weak nucleophile, so that water and alcohols add to the epoxide in preference to counterion $X^-$. It will be appreciated by those skilled in the art that acids with very weakly nucleophilic counterions tend to be very strong acids.

Some acid catalysts, particularly some Lewis acid catalysts, are unstable in the presence of water, and therefore another requirement of the acid catalyst is that it be stable in the water-containing polymerization reaction medium for sufficient time to give the desired technical effect, or that the products of the reaction of the acid with water are themselves acids of sufficient strength to achieve the desired technical effect. The acid material should be sufficiently soluble in the polymerization reaction medium to yield the desired technical effect, desirably at least 0.01 g/100 ml reaction medium solution.

The amount of acid material used is that amount sufficient to catalyze the polymerization reaction of the epoxy resin and water within the temperature and time limits desired. Such catalytic amount will depend on the acid material, the solvent and the epoxy resin used, but in general may range from 0.001 to 1 eq acid catalyst per liter, preferably 0.01 to 0.5 eq/L.

Suitable acids include certain Brønsted, especially Brønsted superacids, and certain Lewis acids. Brønsted acid materials should have a $pKa \leq 1$, preferably $\leq 0$.

Lewis acids include but are not limited to $AlCl_3$, $SbCl_3$, $BiCl_2$, $InCl_3$, $FeBr_3$, $FeCl_3$, $SnCl_4$, $TiCl_4$, $ZnCl_2$, $ZrCl_4$, $BF_3$, various derivatives of $BF_3$ such as boron trifluoride etherate, dialkylzinc catalysts, trialkylaluminum catalysts, and the like. The Lewis acids can also be utilized as complexes with alcohols, ethers, water and the like. Additional examples of suitable Lewis acids can be found in Y. Ishii and S. Sakai, '1,2-Epoxides', in K. C. Frisch and S. L Reegen (ed.), *Ring-opening Polymerzation*, Marcel Dekker: New York, 1969, pp. 13–109, and are included by reference. Cocatalysts and promoters can be used in combination with the Lewis acid catalyst as described in Y. Chujo and T. Saegusa, 'Ring-opening Polymerization', in J. I. Kroschwitz (ed.), *Encyclopedia of Polymer Science and Engineering*, Wiley: New York, 1988, Vol. 14, pp. 622–647. Particularly useful Lewis acids include $BF_3$ and its complexes with alcohols, ethers, water and the like such as boron trifluoride etherate.

Superacids are a particularly useful class of acid for the purposes of this invention. They are described in G. A. Olah, G. K. S. Prakash, and J. Sommer, Superacids, John Wiley & Sons: New York, 1985. Useful superacids include perchloric, fluorosulfuric, trifluoromethanesulfonic, and perfluoroalkylsulfonic acids. They also include Lewis superacids such as $SbF_5$, $TaF_5$, $NbF_5$, $PF_5$, and $BF_3$. They also include hydrogen fluoride in combination with fluorinated Lewis acids such as $SbF_5$, $TaF_5$, $NbF_5$, $PF_5$, and $BF_3$. They also include oxygenated Brønsted acids, such as sulfuric, fluorosulfuric, trifluoromethanesulfonic, and perfluoroalkylsulfonic acid, in combination with Lewis acids, such as $SbF_5$, $TaF_5$, $NbF_5$, $PF_5$, and $BF_3$.

Particularly useful superacids for this process in general, and for the copolymerization of water and diglycidyl ethers of dihydric phenols in particular, include perchloric, trifluoromethanesulfonic, perfluoroalkylsulfonic, tetrafluoroboric, and hexafluorophosphoric acids and boron trifluoride.

The structure of the polymer derived from this process is significantly different from the structure of typical advanced epoxy resins shown above. Based on a combination of 13C NMR and matrix assisted laser desorption/ionization (MALD/I) mass spectrometry, it is believed that the polymer has the following structure:

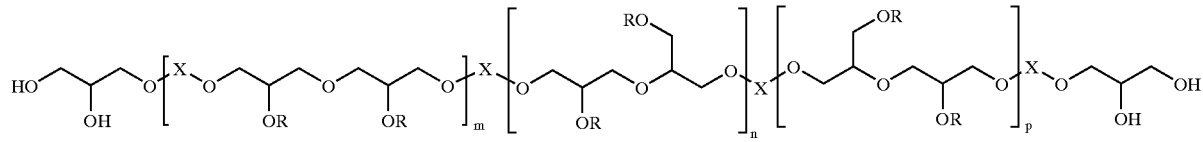

where X is the organic linking group from a diglycidyl ether, R is hydrogen or either of the following radicals 1 or 2:

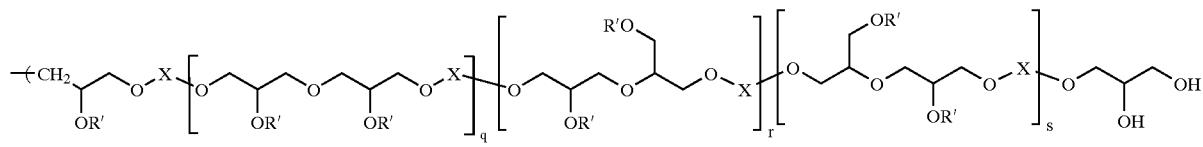

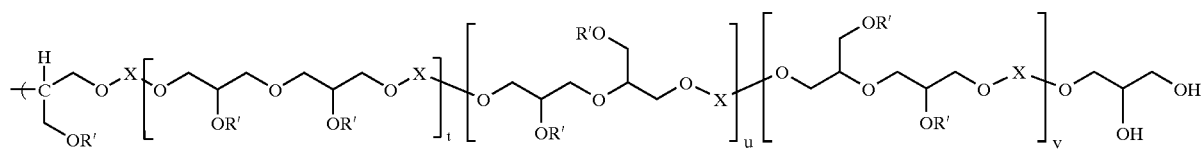

where R'=R or H and where m, n, p, q, r, s, t, u and v range from 0 up to about 50, with the proviso that (m+n+p)≧1. The m, n and p, the q, r and s and the t, u and v units appear in random order. Preferred organic linking groups for X include:

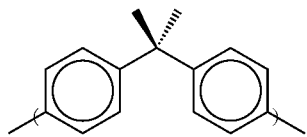

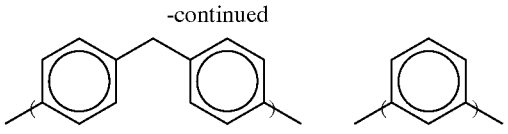

-continued

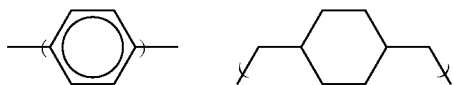

As an example, when the diglycidyl ether of bisphenol-A is the starting material, the polymeric polyol has the following structure;

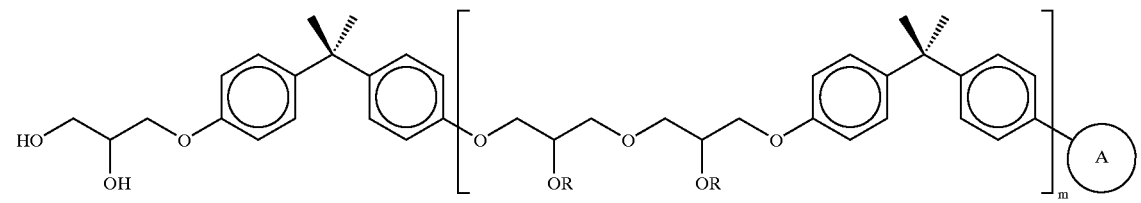

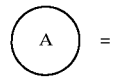 =

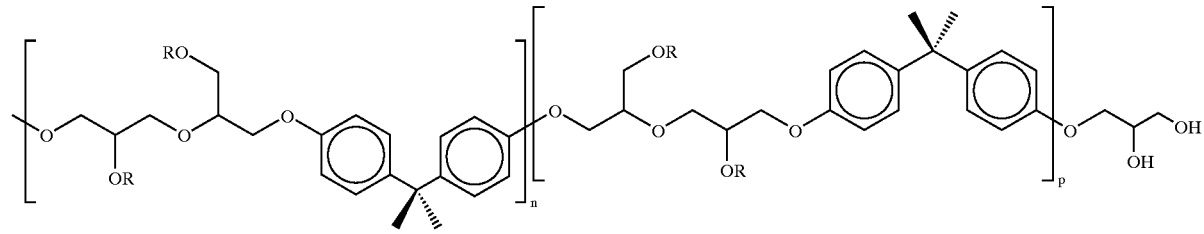

where R=hydrogen or either of the following radicals 1 or 2;

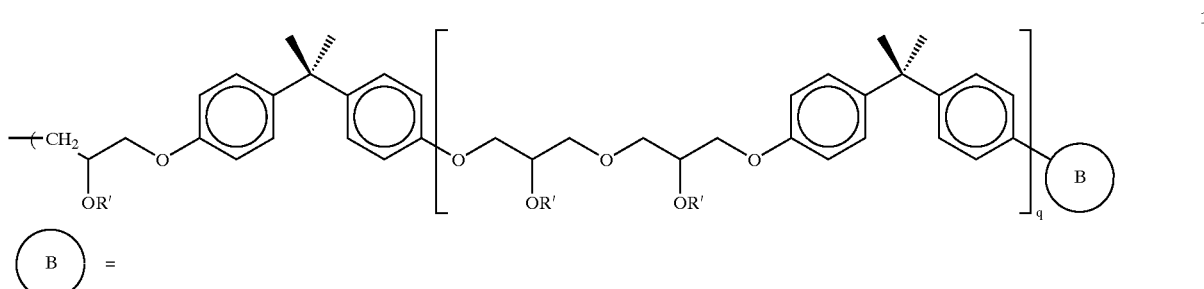

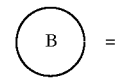 =

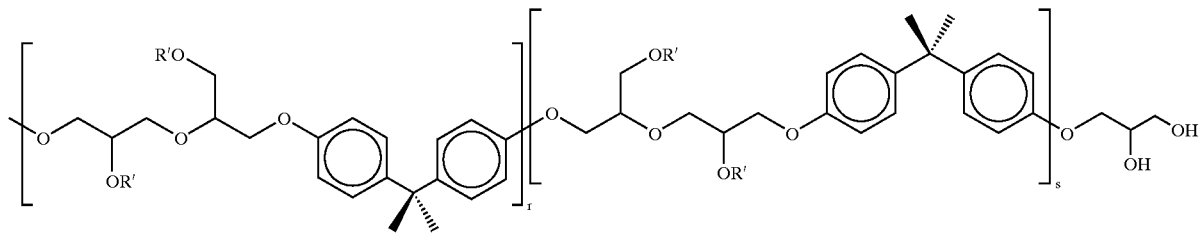

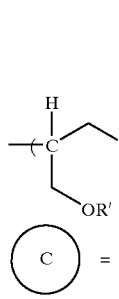

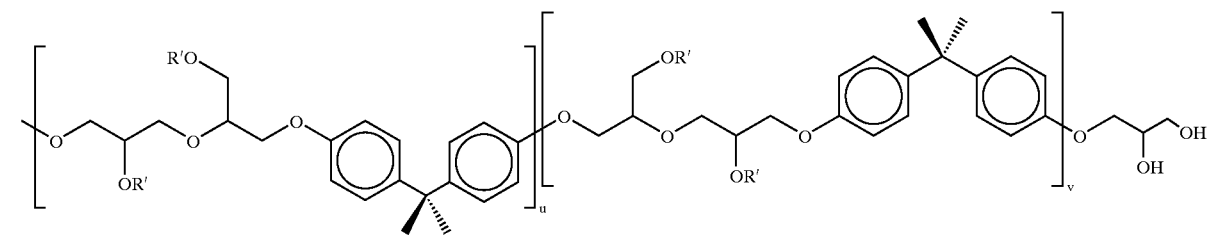

where R'=R or H and where m, n, p, q, r, s, t, u and v range from 0 up to about 50, with the proviso that (m+n+p)≧1. The m, n and p, the q, r and s and the t, u and v units appear in random order. Thus, in contrast to traditional bisphenol-A epoxy resins the repeat unit structure contains two glycidyl units, primary and/or secondary alcohols, as well as the corresponding branching units derived from these alcohols, and all or nearly all of the epoxide end groups have been hydrolyzed to glycol end groups. When R=H, the repeat unit structure contains two glycidyl units and primary and/or secondary alcohols. In the structures shown, repeat units are not included where both hydroxyls or their corresponding branch points are primary, since these units were not detected in the NMR spectrum. However, they probably exist in the reaction mixture, though in quantities below the detection limit of NMR.

While not wishing to be bound by theory, it is believed that the chemical structure results from a polymerization mechanism where the reaction begins by first protonating an epoxide. The protonated epoxide then reacts with water to yield a diol precursor which converts to a polymeric polyol by reaction with more protonated epoxide yielding the repeat unit structure as shown.

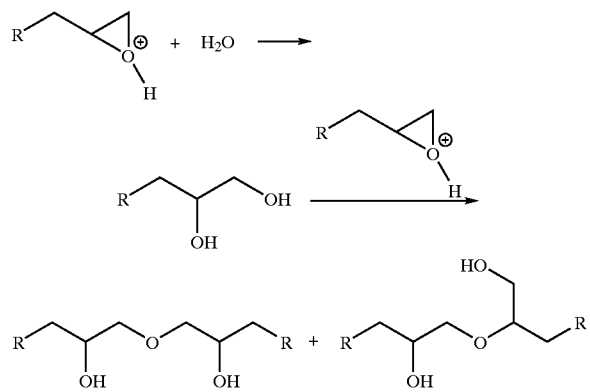

The molecular weight of the polyol product of the copolymerization is dependent on the amount of water employed relative to the amount of multifunctional epoxide. Useful number average molecular weights (Mn), as measured by GPC vs. polystyrene standards, are at least about twice the molecular weight of the multifunctional epoxy resin from which it is prepared, (for diglycidyl ether of bisphenol-A at least about 750), preferably at least about four times the molecular weight, and may range as high as about eight times or more, with the maximum Mn being that which can be achieved without gelling the reaction medium. Below a certain critical, minimum amount of water the product of the reaction is a gel, and hence the molecular weight is undefined. Using commercial diglycidyl ether of bisphenol-A with an equivalent weight of 185–192, it was found that this minimum amount of water was dependent on the specific catalyst employed, the amount of that catalyst, the nature of the solvent for the reaction, and the temperature, but is in the range of about 5 to 8 g of water per 100 g of diglycidyl ether of bisphenol-A at temperatures from about 25° C. to 90° C. In any event, it is relatively straightforward for one skilled in the art to determine the critical amount of water by conducting small scale reactions using progressively smaller amounts of water relative to epoxy resin until a gelled product is obtained.

It is also possible to use monofunctional alcohols to replace a portion of the water in the polymerization to polymeric polyols of this invention. Suitable alcohols include straight-chain and branched aliphatic alcohols, cycloaliphatic alcohols, and aromatic alcohols. It will be recognized by one skilled in the art that an alcohol can only react with one epoxide group forming an ether and an OH group in the polymer, whereas water can react with two epoxide groups to form an ether and two OH groups. Thus, alcohols will chain-stop the polymerization, thereby reducing molecular weight and the critical amount of water needed to prevent gelation. The final product will also have a smaller number of OH groups and a higher OH equivalent weight corresponding to the number of alcohols incorporated into the polymer. Such modification would be anticipated to have an effect on the performance of the final product. For instance, a higher OH equivalent weight will decrease crosslink density, thereby generally decreasing solvent resistance while increasing flexibility.

Suitable solvents employed in this copolymerization are those solvents that substantially dissolve both the multifunctional epoxide compound and the water so that an essentially homogenous reaction mixture is obtained. Other advantages to the use of a solvent include the ability to reduce the viscosity of the reaction medium, which can become very high if the amount of water employed is just sufficient so as to avoid gelation, and the ability to control the temperature of the reaction more reliably. The solvent should also not be so basic that it interferes with the action of the acid catalyst. Importantly, solvents should either not participate to a significant degree in any side reactions under the reaction conditions, or if they do participate in side reactions, should not impart deleterious properties to the function of the product in its intended use. Preferred solvents include ethers and specific examples are the water miscible ethers, such as 1,4-dioxane, 1,2-dimethoxyethane, diglyme, triglyme, and the like.

The reaction can be conducted at temperatures from 0° C. or below up to about 250° C., though the reaction is preferably conducted from about 20° C. to about 150° C., desirably 25 to 120° C. and especially 50 to 100° C. The pressure for the reaction is normally atmospheric pressure, though the reaction can be run under alternative pressures if desired. Pressure will be required if the reaction temperature is above the boiling point of the solvent.

The reaction can be accomplished by mixing the epoxy resin, solvent, and 0 to 100% of the water, and then adding the acid catalyst along with the remaining required water, if any. Since the copolymerization is highly exothermic, this procedure can generate a significant amount of heat. In large scale operations it can be difficult to remove the heat generated from this process so as to control the temperature of the reaction. An alternative procedure that avoids this problem is to combine some or all of the solvent, 0 to 100% of the water, and optionally a portion of the epoxy resin, and then add the acid catalyst and any remaining water. The remaining epoxy resin, diluted in any remaining solvent, is then gradually added to the reaction mixture over a period of time ranging from about 15 minutes to 24 hours, preferably from a half hour to 8 hours. In this manner the heat evolved during the reaction can be more easily be removed, and the reaction temperature better controlled. Many other minor variations to these processes will also be apparent to one skilled in the art.

For example, one can withhold some or all of the water for a period of time after catalyzing the polymerization reaction, but less than the time for gelation to occur, and then add the water. This produces a more branched product than if all the water is present before catalyzing the polymerization reaction.

It is usually desirable to either neutralize the acid catalyst for the copolymerization and/or to remove it from the reaction medium. Neutralization can be accomplished by addition of a base, such as sodium, potassium, or lithium hydroxide or sodium or potassium carbonate. Other suitable bases are well known to one skilled in the art. Removal of the catalyst can be accomplished by neutralizing with a base that forms a salt that is insoluble in the reaction medium followed by filtration, or by treatment of the reaction mixture with an ion exchange resin that will remove the acid catalyst, such as a strong or weak base ion exchange resin.

The polymers prepared by the process of this invention can be crosslinked using crosslinking agents that react with hydroxyl groups. Many such crosslinking agents are known and of industrial importance. Such crosslinking agents include the so-called amino resins which include melamine-formaldehyde resins, urea-formaldehyde resins, benzoguanamine-formaldehyde resins, glycouril-formaldehyde resins, as well as the etherified derivatives of these resins. They are described in Z. W. Wicks, F. N. Jones, and S. P. Pappas, Organic Coatings Science and Technology, 2nd Ed., Wiley-Interscience: New York, 1999, pp. 162–179. Another useful class of crosslinkers that react with OH groups are the multifunctional isocyanates. They are described in Z. W. Wicks, F. N. Jones, and S. P. Pappas, Organic Coatings Science and Technology, 2nd Ed., Wiley-Interscience: New York, 1999, pp. 180–207. Resoles are another useful class of OH-reactive crosslinking agents.

When employing amino resin crosslinkers it is frequently found necessary to include an acid catalyst in the coating formulation. Depending on the type of amino resin employed, this may be a strong acid catalyst such as a sulfonic acid, or a weaker acid such as a carboxylic acid. For example, fully alkylated melamine-formaldehyde resins such as hexamethoxymethyl melamine-formaldehyde resin (HMMM) usually require a strong acid catalyst, whereas high imino, partially alkylated resins respond well to weak acid catalysis. If long term storage in a one component formulation is required, it is common to block the acid catalyst with a volatile amine, and many blocked acid catalysts are commercially available. In addition, one component formulations often contain volatile alcohols such as methanol, ethanol, butanol, glycol ethers and the like which improve the stability of the formulation.

Amino resins and polyols are not usually formulated on the basis of stoichiometry, but rather on a weight basis. In part this is due to the fact that many amino resin crosslinkers self condense at rates comparable to the transetherification reaction with polyols, and also due to the fact that many amino resins have a very high functionality and all of the reactive groups need not react in order to achieve useful properties. However, the exact properties that one obtains are a function of the ratio of amino resin to polyol, and the best formulation for a given application is normally found by running a number of experiments varying this ratio. The ratio of the weight of polymer solids of the current invention to amino resin crosslinker solids that yields useful properties can vary from about 99:1 to 50:50, and preferably from about 95:5 to 70:30.

The time and temperature of cure for an amino resin can vary considerably depending upon the nature of the formulation, the catalyst level, the blocking agent for the catalyst if one is present, and the exact properties desired. Catalyst levels can vary from about 0.05% based on total resin solids to about 10%. Cure temperature can vary from ambient temperature (about 20° C.) to about 300° C., and cure times can vary from several hours to just a few seconds. For example, combinations of high catalyst level, low cure temperature and long cure time might be employed for a substrate that cannot tolerate high temperatures such as wood paneling. A coil coating, in contrast, may be cured for only a few seconds at a very high temperature using a more modest level of catalyst.

Isocyanates useful in curing the polymers of the current invention include both aromatic and aliphatic isocyanates. Useful aromatic isocyanates include any of the commercially available aromatic isocyanates such as toluene diisocyanate (TDI), diphenylmethane-4,4'-diisocyanate (MDI), and aromatic isocyanates derived from oligomers of the reaction of formaldehyde and aniline. Aliphatic isocyanates include any of the commercially available aliphatic isocyanates such as isophorone diisocyanate (IPDI), hexamethylene diisocyanate (HMDI), trimethylhexamethylene diisocyanate, bis-(4-isocyanatocyclohexyl)-methyl diisocyanate (H12MDI), tetramethylxylylene diisocyanate (TMXDI), and polymeric isocyanates prepared by the polymerization of m-isopropenyl-α,α-dimethylbenzyl isocyanate (m-TMI). In addition, derivatives of the aliphatic and aromatic diisocyanates such as their isocyanurate timers, biurets, and adducts with polyols such as trimethylolpropane are also useful crosslinkers for the current invention.

The isocyanates may be used without modification, in which case the formulation will most likely be two component, with a pot life ranging from fractions of an hour to a day or so, where the isocyanate and polyol are stored in separate containers and mixed prior to use. Cure temperatures for these systems generally range from ambient temperatures to moderate baking temperatures. The reactions are usually catalyzed with tin, bismuth, zirconium and other metal salt catalysts, or by tertiary amines, or by combinations of metals and amines. The isocyanates may on the other hand be reacted with a blocking agent that is released to reform the isocyanate under baking conditions, which can then go on to react with the polyol of the current invention. Useful blocking agents include volatile alcohols, phenols, ketoximes, and β-keto-esters, and are well known to those skilled in the art. Catalysts similar to those employed in the two component formulations are also employed in the one component formulations. Relatively high bake temperatures ranging from about 90° C. to 300° C. are employed, depending again on catalyst concentration and cure time requirements.

Coatings prepared from the resins of the current invention and crosslinkers can be formulated with a wide variety of ingredients well known to those skilled in the art of coating formulation, including solvents, fillers, pigments, pigment dispersing agents, rheology modifiers, thixotropes, flow and leveling aids, defoamers, and the like.

Coatings of this invention can be applied by any number of techniques including spray, brush, roller, doctor blade, and others known in the art. They may also be applied using specialized industrial equipment such as that employed in coil coatings. Numerous substrates are suitable for application of coatings of this invention with proper surface preparation, as is well understood in the art. Such substrates include but are not limited to many types of metal, particularly steel and aluminum, as well as wood and various plastics.

EXAMPLE 1

This example shows the preparation of polymeric polyol using 12 g water per 100 g epoxy resin. In a 1000 mL 4-neck round bottom flask equipped with a mechanical stirrer, thermocouple and reflux condenser was placed 250 g of Epon® 828 resin (Resolution Chemical Company, liquid epoxy resin based on the diglycidyl ether of bisphenol-A, epoxy equivalent weight 185–192) and 250 g 1,4-dioxane. The temperature was raised to 90° C. using a heating mantle, and 8.33 g of 60% perchloric acid in water was added, which gave an exotherm of 3° C. After stirring for 1 hour at 90° C., 26.67 g of deionized water was added to the reaction mixture. After stirring for 1.5 hours, it was determined that approximately 99% of the epoxide groups were consumed by measuring the epoxide absorption at 916 $cm^{-1}$ in the IR spectrum normalized to gem-dimethyl absorbances at 1383 and 1362 cm$^{-1}$. The reaction mixture was diluted with 90 g of THF, and immediately neutralized by the addition of 63 mL of Amberlite® IRA-67 weak base ion exchange resin (Rohm and Haas Corporation). The final product was 45.9% NV (1 hour, 110° C.), and by GPC had Mw=4155, Mn=1580, and Mw/Mn=2.6 as measured in THF vs polystyrene standards.

EXAMPLE 2

This example explains the procedure for measuring extent of reaction by IR spectroscopy. A few drops of solution were placed on an out-of-compartment attenuated total reflectance 45° Zn-Se flat cell, available from Spectra-tech, Inc., Shelton, Conn. The solution was smeared across the cell surface using a soft cotton pad. Solvent was allowed to evaporate from the resulting thin film for about 1 min. The IR spectrum (32 scans) was then obtained in absorption mode, and then processed to obtain the 2nd derivative of the spectrum. The height of the gem-dimethyl absorbances at 1383 and 1362 cm$^{-1}$ were then measured, and divided into the height of the epoxy ring absorbance at 916 cm$^{-1}$. This yields a normalized absorbance for the epoxide, since the gem-dimethyl group is inert toward the reaction conditions. To estimate the extent of reaction as a function of time, the normalized epoxy absorbance at time t was divided by the normalized absorbance at t=0. This procedure will not be accurate if the solvent has a strong absorbance near 916 cm$^{-1}$ and the solvent is slow to leave the film, as can happen when high molecular weight products are prepared.

EXAMPLES 3–8

These examples show the preparation of polymeric polyols using varying amounts of water. Following the general procedure of Example 1, the polyols described in Table 1 were prepared. The reactions were held at temperature until the IR spectrum indicated that the reaction was essentially complete (>98% conversion of epoxide). The results show that decreasing the ratio of water to epoxy resin results in an increase in the molecular weight and polydispersity of the final product.

75 g of 2-butoxyethanol, and immediately neutralized by the addition of 60 mL of Amberlite IRA-67 weak base ion exchange resin. The final product by GPC had Mw=12,300, Mn=2640, and Mw/Mn=4.6 as measured in THF vs polystyrene standards.

EXAMPLE 10

This example shows the use of methanesulfonic acid as catalyst. The general procedure of Example 9 was followed, except that a mixture of 5.46 g of 70% methane-sulfonic acid (0.0398 moles) and 11.36 g of deionized water was substituted for the perchloric acid and water mixture. After heating for 5.5 hours at 90° C., stirring overnight at room temperature, and heating an additional 9 hours at 90° C., the IR spectra indicated that only approximately 10% of the epoxide groups were lost. This experiment indicates that methanesulfonic acid is a much less effective catalyst than perchloric acid under these conditions.

EXAMPLE 11

This example shows the use of p-toluenesulfonic acid as catalyst. The general procedure of Example 9 was followed, except that a mixture of 7.48 g of p-toluene-sulfonic acid (0.0398 moles) and 13.00 g of deionized water was substituted for the perchloric acid and water mixture. After heating for 5 hours at 90° C. the IR spectra showed no measurable loss of epoxide groups. This experiment indicates that p-toluenesulfonic acid is not an effective catalyst under these conditions. p-Toluene-sulfonic acid may be effective at higher temperatures under pressure.

EXAMPLE 12

This example shows the use of sulfuric acid as catalyst. The general procedure of Example 9 was followed, except that a mixture of 4.05 g of 96.2% sulfuric acid (0.0398 moles) and 12.84 g of deionized water was substituted for the perchloric acid and water mixture. After heating for 6 hours at 90° C., a sample was removed and titrated to determine the epoxide equivalent weight (EEW) with perchloric acid in the presence of glacial acetic acid and

TABLE 1

| Ex | Epon 828 | 1,4-Dioxane | 60% Perchloric Acid | DI Water | % Water on Epoxy Resin | Temp. (° C.) | Mw | Mn |
| --- | --- | --- | --- | --- | --- | --- | --- | --- |
| 3 | 250 | 250 | 8.33 | 19.17 | 9 | 90 | 5836 | 1800 |
| 4 | 250 | 250 | 8.33 | 14.17 | 7 | 90 | 19700 | 2820 |
| 5 | 250 | 250 | 8.33 | 12.92 | 6.5 | 90 | 21750 | 2985 |
| 6 | 250 | 250 | 8.33 | 11.67 | 6 | 90 | Gel | Gel |
| 7 | 50 | 50 | 0.83 | 5.67 | 12 | 75 | 2770 | 1460 |
| 8 | 250 | 250 | 4.17 | 15.83 | 7 | 75 | 14800 | 2750 |

EXAMPLE 9

This example shows the preparation of polymeric polyol using 6.5 g water per 100 g epoxy resin, perchloric acid catalyst, and simultaneous addition of water and catalyst. In a 1000 mL 4-neck round bottom flask equipped with a mechanical stirrer, thermocouple and reflux condenser was placed 200 g of Epon 828 resin and 200 g 1,4-dioxane. The temperature was raised to 90° C. using a heating mantle, and a mixture of 6.66 g 60% perchloric acid (0.0398 moles) and 10.33 g of deionized water was added to the reaction mixture. After stirring for 4 hours, it was determined that approximately>99% of the epoxide groups were consumed by IR spectroscopy. The reaction mixture was diluted with tetraethyl ammonium bromide. The sample was analyzed to have an EEW of 249 based on epoxy resin solids, indicating that only about 22.4% conversion of epoxide groups had occurred. This experiment indicates that sulfuric acid is a less effective catalyst than perchloric acid under these conditions.

EXAMPLE 13

This example shows the use of trifluoromethanesulfonic acid as catalyst and 13% water on epoxy resin. In a 250 mL 3-neck round bottom flask equipped with mechanical stirrer, thermocouple and reflux condenser was placed 50 g of Epon 828 resin and 50 g of 1,4-dioxane and stirred at 24° C. A mixture of 6.50 g of deionized water and 1.30 g of trifluoromethanesulfonic acid was add through an addition funnel over the course of 10 minutes. The reaction mixture exothermed to 33° C. over the next half hour. After an additional half hour, the temperature was raised to 60° C., at which point the epoxide conversion was estimated to be about 95% by IR spectroscopy. The mixture was held at 60° C. for 4 hours. After cooling to room temperature it was neutralized with 12.5 mL of Amberlite IRA-67 ion exchange resin. The final product had Mw=2455 and Mn=1320.

EXAMPLE 14

This example shows the use of trifluoromethanesulfonic acid as catalyst and 6.5% water on epoxy resin. In a 250 mL 3-neck round bottom flask equipped with mechanical stirrer, thermocouple and reflux condenser was placed 50 g of Epon 828 resin and 50 g of 1,4-dioxane and stirred at 24° C. A mixture of 3.25 g of deionized water and 1.30 g of trifluoromethanesulfonic acid was add through an addition funnel. The reaction mixture exothermed to 37° C. over the 15 minutes. After an additional hour, the temperature was raised to 50° C. for about 2 hours, then to 60° C., at which point the reaction mixture gelled.

EXAMPLE 15

This example shows the gradual addition of epoxy resin. In a 500 mL 4-neck round bottom flask equipped with mechanical stirrer, thermocouple and reflux condenser was placed 30.00 g Epon 828 resin, 76.67 g 1,4-dioxane, and 7.50 g DI water. The temperature was 23° C. Through a constant pressure addition funnel, 3.33 g of 60% perchloric acid was added over the course of 5 minutes. Over the course of the next 30 minutes, the temperature rose to 39° C. Heat was then applied from a mantle to raise the temperature to 65° C. A mixture of 70.00 g Epon 828 resin and 23.33 g 1,4-dioxane was then gradually added over 2.5 hours with a Masterflex® peristaltic pump with teflon lines. A sample was removed 30 minutes after completion of the feed and titrated with perchloric acid in the presence of glacial acetic acid and tetraethylammonium bromide, and no end point could be found, indicating that epoxide conversion was complete within the limits of detection of the method. The mixture was held at 65° C. for an additional 3 hours, then cooled to 40° C. and neutralized with 25 mL of IRA-67 ion exchange resin. The final product had Mw=5360 and Mn=1900.

EXAMPLE 16

This example shows the use of a Lewis acid catalyst. In a 250 mL 3-neck round bottom flask equipped with mechanical stirrer, thermocouple and reflux condenser was placed 50.00 g Epon 828 resin, 50.00 g 1,4-dioxane, and 4.00 g DI water. The temperature was 25° C. One mL of boron trifluoride etherate was added via syringe. Over the next 1.5 hours the temperature gradually exothermed to 44° C. The reaction was then heated to 65° C. and held at that temperature for 3.25 hours, at which point a titration with perchloric acid in the presence of glacial acetic acid and tetraethyl-ammonium bromide gave no end point, indicating that epoxide conversion was complete within the limits of detection of the method. Heating was continued for an additional 3 hours, and then IRA-67 ion exchange resin was added to neutralize the reaction product. The final product had Mw=9010 and Mn=2445.

EXAMPLE 17

This example compares the levels of residual bisphenol-A and DGEBA in commercial epoxy resins and polyols of the current invention. In a 1000 mL 4-neck round bottom flask equipped with a mechanical stirrer, thermocouple and reflux condenser was placed 250 g of Epon 828 resin and 250 g 1,4-dioxane. The temperature was raised to 90° C. using a heating mantle, and 8.33 g of 60% perchloric acid in water was added, which gave an exotherm of 3° C. After stirring for 1 hour at 90° C., 14.17 g of deionized water was added to the reaction mixture. The reaction mixture was held at 90° C. for 23.5 hours, then diluted with 125 g of THF, and immediately neutralized by the addition of 62 mL of Amberlite IRA-67 weak base ion exchange resin. The product was determined by GPC to have Mw=19700 and Mn=2820, as measured in THF vs polystyrene standards. The material was then transferred to a 4 neck round bottom flask along with 109.31 g of 2-butoxyethanol to which was attached a distillation head. Solvent was taken off until the head temperature reached 116° C. so as to remove most of the 1.4-dioxane. The final product had a solids content determined for 1 hour at 110° C. of 76.8%.

This product was then analyzed for bisphenol-A and DGEBA by HPLC using a Waters Alliance 2690 HPLC system with Waters 996 photodiode array detector. The HPLC was performed under a gradient of 30% acetonitrile and 70% water to 70% acetonitrile and 30% water in 60 minutes on a Waters Symmetry C18 column (250×4.6 mm), at a column temperature of 40° C. Calibration standards used were bisphenol-A 99+% and Epon 826 resin, which was assumed to contain 85% DGEBA monomer. The resin prepared as described above was compared to commercial bisphenol-A resins designated Resin A (EEW 1700–2300) and Resin B (EEW 2300–3800), as shown in Table 2. It is clear that the polyol of the current invention had much lower levels of residual bisphenol-A and DGEBA than these commercial high molecular weight epoxy resins.

TABLE 2

| Sample | Bisphenol-A, ppm | DGEBA, ppm |
|---|---|---|
| Polyol of Ex 17 | 8.5 | 88 |
| Resin A | 137 | 4730 |
| Resin B | 447 | 3321 |

EXAMPLES 18–21

These examples show melamine cured coatings from polyols of Examples 5 and 17, and comparison to control formulations. The formulations based on the parts by weight given in Table 3 were prepared. All formulations contained an 80/20 ratio of polyol resin to hexamethoxymethyl melamine-formaldehyde resin (HMMM, Resimene® 747, Solutia Inc.) on a solids basis, and contained 0.03% p-TSA on solids. The 10% p-TSA was added to the formulations immediately prior to application to Bonderite® 1000 panels (Fe-phosphate treated steel) with a #20 wire wound bar. Solvents were then allowed to flash off from the panels for 30 minutes in a hood. The panels were then baked for 30 minutes at the specified temperatures given in Table 4. It is clear from the data that polymeric polyol resins of the current invention developed excellent chemical resistance (>250 MEK double rubs) at much lower temperature than conventional high molecular weight epoxy resins.

TABLE 3

Coating Formulations

| | Example 18 | | Example 19 | | Example 20 | | Example 21 | |
|---|---|---|---|---|---|---|---|---|
| | Polyol Example | | | | | | | |
| | Ex. 17 | | Ex. 5 | | Epon ® 1007-CT-55 | | Epon ® 1009-DU-40 | |
| | Wt | Solids Wt | Wt | Solids Wt | Wt | Solids Wt | Wt | Solids Wt |
| Polyol | 20.83 | 16.00 | 35.00 | 16.00 | 29.09 | 16.00 | 40.00 | 16.00 |
| HMMM | 4.08 | 4.00 | 4.08 | 4.00 | 4.08 | 4.00 | 4.08 | 4.00 |
| Solvent | 41.35 | 0.00 | 27.16 | 0.00 | 33.10 | 0.00 | 22.18 | 0.00 |
| 10% p-TSA | 0.60 | 0.06 | 0.60 | 0.06 | 0.60 | 0.06 | 0.60 | 0.06 |
| Total | 66.86 | 20.06 | 66.84 | 20.05 | 66.87 | 20.06 | 66.86 | 20.06 |

TABLE 4

Coatings Performance Properties

| Example | 18 | 29 | 20 | 21 |
|---|---|---|---|---|
| MEK Dbl Rubs | | | | |
| Cure at 90° C. | >250 | >250 | Fail @ 10 | Fail @ 10 |
| Cure at 100° C. | — | — | Fail @ 200 | >250 |
| Cure at 110° C. | — | — | >250 | — |
| Performance with 90° Cure | | | | |
| 20° GLOSS | 65.0 | 54.6 | 80.8 | 67.1 |
| 60° GLOSS | 102.1 | 99.0 | 110.6 | 104.1 |
| Cross-hatch Adhesion | 4B | 3B | 5B | 5B |
| Water Immersion, 24 Hr. | Pass | Pass | Pass | Pass |
| Persoz Hardness | 358 | 341 | 377 | 353 |
| Performance with 130° Cure | | | | |
| 20° GLOSS | 42.0 | 46.2 | 65.2 | 60.0 |
| 60° GLOSS | 91.5 | 92.0 | 101.6 | 98.3 |
| Cross-hatch Adhesion | 0B | 0B | 3B | 3B |
| Water Immersion, 24 Hr. | Pass | Pass | Pass | Pass |
| Persoz Hardness | 360 | 364 | 382 | 381 |

EXAMPLE 22

This example shows the copolymerization of a bisphenol-F resin. In a 500 mL 4-neck round bottom flask equipped with mechanical stirrer, thermocouple and reflux condenser was placed 28.19 g Epalloy 8220 resin (CVC Specialty Chemicals, liquid epoxy resin based on the diglycidyl ether of bisphenol-F, epoxy equivalent weight 164–176), 82.05 g 1,4-dioxane, and 7.05 g DI water. The temperature was 22° C. Through a constant pressure addition funnel, 3.33 g of 60% perchloric acid was added over the course of 5 minutes. Over the course of the next 30 minutes, the temperature rose to 37° C. Heat was then applied from a mantle to raise the temperature to 90° C. A mixture of 71.81 g Epalloy 8220 resin and 17.95 g 1,4-dioxane was then gradually added over 3.0 hours with a Masterflex® peristaltic pump with teflon lines. A sample was removed 30 minutes after completion of the feed and titrated with perchloric acid in the presence of glacial acetic acid and tetraethylammonium bromide, and no end point could be found, indicating that epoxide conversion was complete within the limits of detection of the method. The mixture was held at 90° C. for an additional 3 hours, then cooled to 40° C. and neutralized with 25 mL of IRA-67 ion exchange resin. The final product had Mw=15,427 and Mn=2,533.

EXAMPLE 23

This example shows the copolymerization of the diglycidyl either of resorcinol. In a 500 mL 4-neck round bottom flask equipped with mechanical stirrer, thermocouple and reflux condenser was placed 59.80 g ERISYS RDGE/H resin (CVC Specialty Chemicals, liquid epoxy resin based on the diglycidyl ether of resorcinol, epoxy equivalent weight 115–120), 119.93 g 1,4-dioxane, and 14.95 g DI water. The temperature was 21° C. Through a constant pressure addition funnel, 5.00 g of 60% perchloric acid was added over the course of 5 minutes. Over the course of the next 30 minutes, the temperature rose to 79° C. Heat was then applied from a mantle to maintain the temperature at 65° C. A mixture of 90.20 g ERISYS RDGE/H epoxy resin and 30.07 g 1,4-dioxane was then gradually added over 3.0 hours with a Masterflex® peristaltic pump with teflon lines. A sample was removed 30 minutes after completion of the feed and titrated with perchloric acid in the presence of glacial acetic acid and tetraethylammonium bromide, and no end point could be found, indicating that epoxide conversion was complete within the limits of detection of the method. The mixture was held at 90° C. for an additional 3 hours, then cooled to 40° C. and neutralized with 37.5 mL of IRA-67 ion exchange resin. The final product had Mw=3,441 and Mn=1,536.

STATEMENT OF INDUSTRIAL APPLICATION

The invention provides a method for the preparation of polymeric polyols from epoxy resins suitable for use in coating compositions that contain lower levels of residual bisphenol-A and DGEBA.

We claim:

1. A method for preparing a polymeric polyol which comprises copolymerizing a multifunctional epoxide resin and water in the presence of an amount of acid effective for polymerizing the epoxide resin and the water, wherein the epoxide resin comprises at least one epoxide resin selected from the group consisting of diglycidyl ether of bisphenol-A, an advanced diglycidyl ether of bisphenol-A, diglycidyl ether of bisphenol-F, an epoxy novolac resin, and diglycidyl ether of resorcinol, the amount of water being sufficient to avoid gelation, the copolymerization being a non-dispersion process and performed in the presence of a solvent that substantially dissolves both the epoxide resin and the water.

2. The method of claim 1 in which the solvent is a water miscible ether.

3. The method of claim 1 in which the solvent is 1,4-dioxane, 1,2-dimethoxyethane, diglyme or triglyme.

4. The method of claim 1 in which the acid is a Brønsted acid having a pKa≦1 or a Lewis acid.

5. The method of claim 1 in which the acid is a Brønsted acid having a pKa≦0.

6. The method of claim 1 in which the acid is a Brønsted superacid.

7. The method of claim 1 in which the acid is perchloric acid, trifluoromethanesulfonic acid, perfluoroalkylsulfonic acid, tetrafluoroboric acid, hexafluorophosphoric acid or boron trifluoride.

8. The method of claim 1 in which the minimum amount of water is about 2.5 to 10 g per equivalent of epoxide resin.

9. A method for preparing a polymeric polyol which comprises copolymerizing at least one multifunctional epoxide resin which is a diglycidyl ether of bisphenol-A, an advanced diglycidyl ether of bisphenol-A, a diglycidyl ether of bisphenol-F, diglycidyl ether of resorcinol, or an epoxy novolac resin, and water in a water miscible ether and in the presence of an amount of a superacid effective for polymerizing the epoxide resin and the water, the amount of water being sufficient to avoid gelation.

10. The method of claim 9 in which the solvent is 1,4-dioxane, 1,2-dimethoxyethane, diglyme or triglyme.

11. The method of claim 10 in which the minimum amount of water is about 2.5 to 10 g per equivalent of epoxide resin.

12. The method of claim 11 in which the epoxide resin is the diglycidyl ether of bisphenol-A.

13. The method of claim 12 in which the amount of water is 5 to 20 g per 100 g epoxide resin.

14. The method of claim 9 in which the acid is perchloric acid, trifluoromethanesulfonic acid, perfluoroalkylsulfonic acid, tetrafluoroboric acid, hexafluorophosphoric acid or boron trifluoride.

15. The method of claim 9 in which the acid is perchloric acid.

16. The method of claim 9 in which the amount of acid is 0.001 to 1 eq/L.

17. A method for preparing a polymeric polyol which comprises copolymerizing a diglycidyl ether of bisphenol-A and water in the presence of a water miscible ether and in the presence of an amount of a superacid effective for polymerizing the epoxide resin and the water, the minimum amount of water being 5 to 8 g per 100 g diglycidyl ether of bisphenol-A.

18. The method of claim 17 in which the acid is perchloric acid, trifluoromethanesulfonic acid, perfluoroalkylsulfonic acid, tetrafluoroboric acid, hexafluorophosphoric acid or boron trifluoride.

19. The method of claim 18 in which the water miscible ether is 1,4-dioxane, 1,2-dimethoxyethane, diglyme or triglyme.

20. The method of claim 19 in which the amount of water is 5 to 20 g per 100 g epoxide resin.

21. A coating composition comprising a polymeric polyol made according to the method of claim 1 and a hydroxyl group-reactive crosslinking agent.

22. A coating composition comprising a polymeric polyol made according to the method of claim 9 and a hydroxyl group-reactive crosslinking agent.

23. The coating composition of claim 21 in which the crosslinking agent is an amino resin or a multifunctional isocyanate.

24. A polymeric polyol comprising glycol end groups and a repeat unit structure which contains two glycidyl units and primary and/or secondary alcohols and having a Mn of at least about 750.

25. The polymeric polyol of claim 24 which comprises the following structure

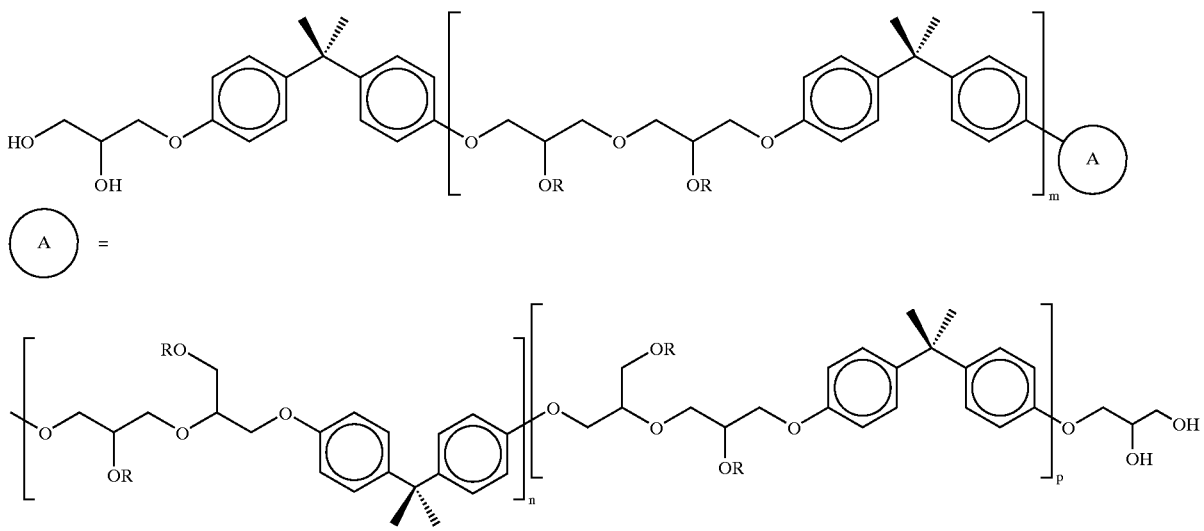

where R=hydrogen or either of the following radicals 1 or 2:
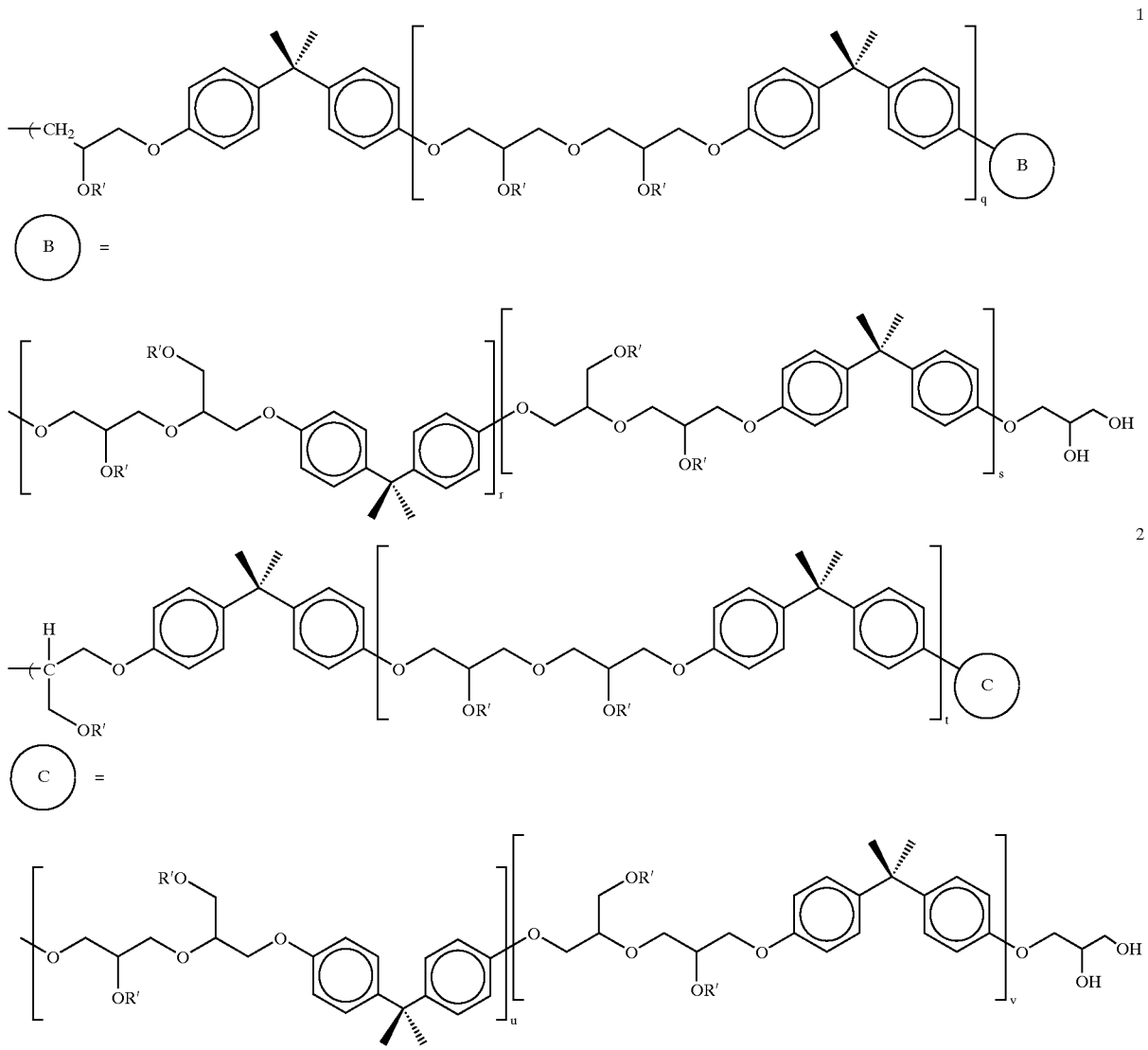
where R'=R or H and where m, n, p, q, r, s, t, u and v range from 0 up to about 50, with the proviso that (m+n+p)≧1; the m, n and p, the q, r and s and the t, u and v units appearing in random order.
26. The polymeric polyol of claim 25 which has the following structure
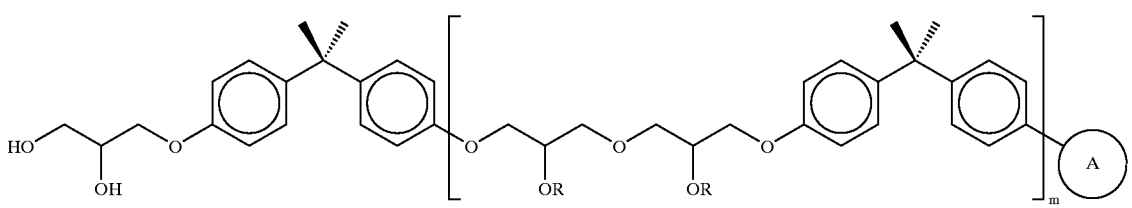

 =

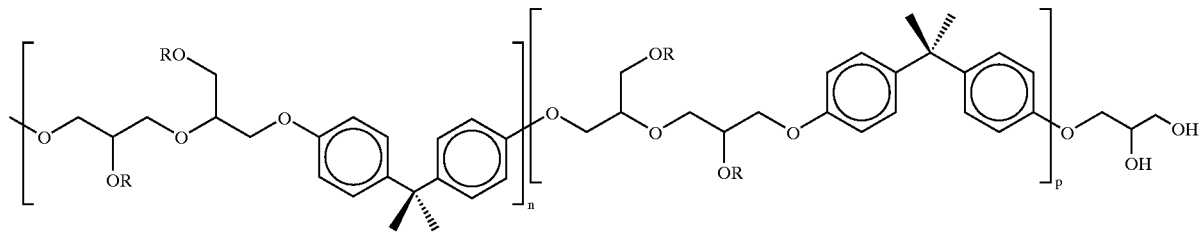

where R is H, and m, n and p range from 0 up to about 50, with the proviso that (m+n+p)≧1; the m, n and p units appearing in random order.

27. A polyol composition comprising the polymeric polyol of claim 24 which is substantially free of surfactants.

28. The polymeric polyol of claim 26 which comprises the following structure

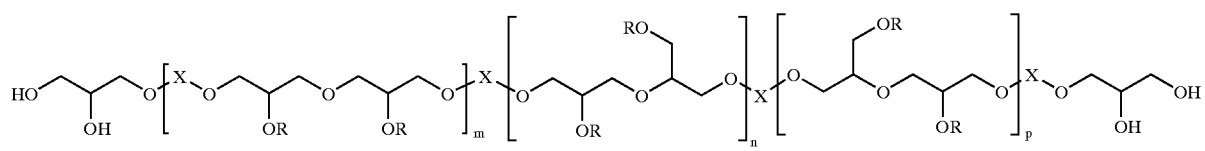

where X is an organic linking group from a diglycidyl ether, R is hydrogen or either of the following radicals 1 or 2:

1

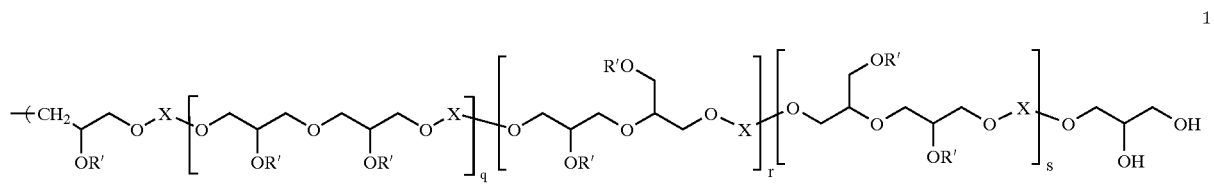

2

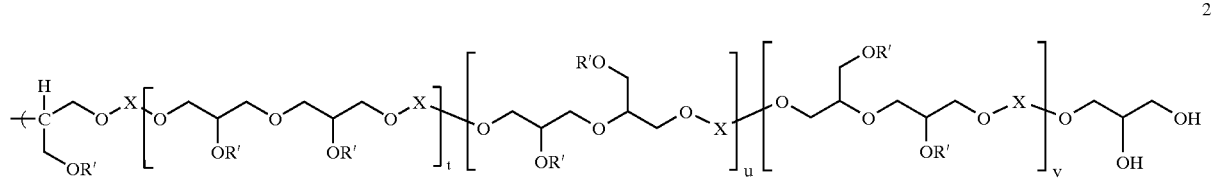

where R'=R or H and where m, n, p, q, r, s, t, u and v range from 0 up to about 50, with the proviso that (m+n+p)≧1; the m, n and p the q, r and s and the t, u and v units appearing in random order.

29. The polymeric polyol of claim 28 in which the organic linking group X is selected from the group consisting of

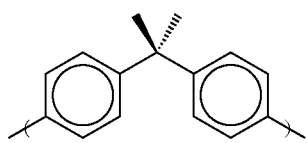

-continued

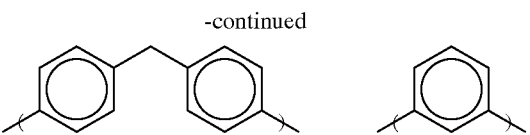

-continued

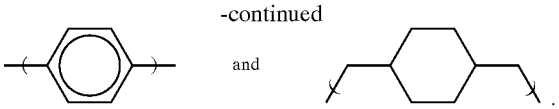

and

30. A polyol composition comprising a polymeric polyol having an Mn of at least about 750 prepared from a diglycidyl ether of a dihydric phenol or diol in which the level of residual dihydric phenol or diol in the polyol is less than 20 ppm and the level of residual diglycidyl ether of dihydric phenol or diol is less than 500 ppm.

31. The polyol composition of claim 30 in which the dihydric phenol or diol is bisphenol-A or resorcinol and the diglycidyl ether of a dihydric phenol or diol is diglycidyl ether of bisphenol-A or resorcinol, respectively.

32. The polyol composition of claim 30 in which the level of residual dihydric phenol or diol in the polyol is less than 10 ppm and the level of residual diglycidyl ether of dihydric phenol or diol is less than 100 ppm.

33. The polyol composition of claim 32 in which the dihydric phenol or diol is bisphenol-A or resorcinol and the diglycidyl ether of a dihydric phenol or diol is diglycidyl ether of bisphenol-A or resorcinol, respectively.

* * * * *